Sept. 29, 1970   YASUO TARUI ET AL   3,531,716
METHOD OF TESTING AN ELECTRONIC DEVICE BY USE OF AN ELECTRON BEAM
Filed March 13, 1968

SECONDARY ELECTRON DETECTER

INVENTORS
YASUO TARUI et al
BY Hancock, Downing & Seebold
Attorneys

United States Patent Office 3,531,716
Patented Sept. 29, 1970

3,531,716
METHOD OF TESTING AN ELECTRONIC DEVICE BY USE OF AN ELECTRON BEAM
Yasuo Tarui, Kurume-machi, and Seiichi Denda, Hoya-shi, Japan, assignors to Agency of Industrial Science and Technology, Ministry of International Trade and Industry, Tokyo-to, Japan, an authority of the Japanese Government
Filed Mar. 13, 1968, Ser. No. 712,762
Claims priority, application Japan, June 16, 1967, 42/38,145, 42/38,146
Int. Cl. G01r 31/02
U.S. Cl. 324—51    3 Claims

ABSTRACT OF THE DISCLOSURE

A method of testing electric connection or circuit operation and character of an electronic device such as a multilayer wiring plate, simiconductor and thin film type integrated circuit and the like, which comprises projecting an electron beam onto a portion of the electronic device to be tested to generate an electric potential, and detecting the electric potential of a portion of the device under test to obtain an output signal.

BACKGROUND OF THE INVENTION

The present invention relates to a novel method for testing electric connection or characters of electronic devices such as multilayer wiring plates, semiconductors and thin film type integrated circuits and the like.

Heretofore from the economical point of view, carrying-out of precise and rapid tests of the electronic devices in the wafer state of said devices has been very important.

In a conventional method for testing an electronic device in the wafer state thereof, it has been the usual method to use a mechanical multiprobe, to carry out the measurement per chip. However such conventional method has various difficulties when it comes to measuring period of time and data processing. Furthermore, for the purpose of miniaturizing the circuit of an electronic device, for example, an integrated circuit, to be tested, the electrode area adapted to cause contact of the mechanical probing needles should be reduced as much as possible, but this reduction is usually limited by the precision of the probing needles, whereby a limit on high speed of the testing and high frequency character of the electronic device to be tested is imposed.

SUMMARY OF THE INVENTION

It is therefore the primary object of the present invention to provide a novel and effective method adapted to test or measure rapidly and easily the connection and/or character of any electronic device of micro-structure, without overcoming the disadvantages of the conventional method.

It is another object of the present invention to provide an effective and novel method for testing any electronic device of micro-structure, said method being convenient for applying to the discretionary wiring technique, which corrects only good chips according to the result obtained by the measurement.

The foregoing objects and other objects as well as the characteristic features of the present invention will become more apparent and more readily understandable by the following description and appended claims when read in conjunction with the accompanying drawings, in which the same or equivalent elements are designated by the same numerals.

DETAILED DESCRIPTION OF THE INVENTION

Figure 1:
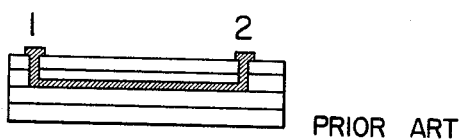
FIG. 1 is a schematic side view showing a multilayer wiring plate.

When the circuit connection state of a multilayer wiring plate such as that shown in FIG. 1 is to be tested, an area of at least 50 micron x 50 micron is conventionally required for the contact of a probing needle in order to test whether or not the terminals 1 and 2 are correctly connected. Furthermore, in the case of a multilayer wiring plate having more than ten layers, processing and valuation of the measured data require a long period of time, and productivity and economization are reduced because there are a large number of data combinations.

Figure 2:
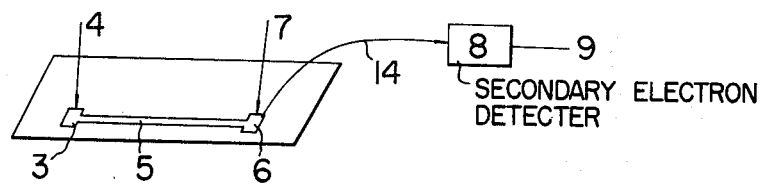
FIG. 2 is a schematic, perspective view indicating an application of the method of the invention to testing of the connection state of a very simple circuit.

However, according to the present invention, since an electron beam can be narrowed to have a diameter of the order of 1 micron, and the position thereof can be easily controlled within a distance of 1 micron, it is very easy to project an electron beam 4 onto a very narrow predetermined terminal 3 in any wiring plate as shown in FIG. 2. In this case, an electric potential is generated in the metallic film 5 by said emitted electron beam upon impingement thereof.

In FIG. 2, when an electric potential is generated as described above, an electric potential is generated at the other terminal 6 of the metallic film 5. This generated voltage can be detected, as an output signal 9, by means of a detector 8 for secondary electrons 14 which are generated by directing a weak electron beam 7 onto the terminal 6, the detector 8 not being shown in detail because of its conventional construction.

The method of the present invention can be effectively applied to other electronic devices such as delicate and complex circuits of any integrated circuit, circuits provided with multiwiring, and the like. Furthermore, even when any resistance element or pn junction exists between circuit terminals, the electroconductivity and correct value of said element can be confirmed according to the method of the present invention.

Figure 3:
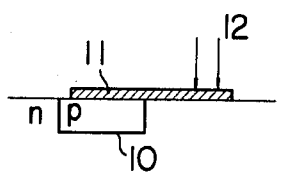
FIG. 3 is a schematic side view showing a manner of applying a bias due to an electron beam according to method of the present invention.
Figure 4:
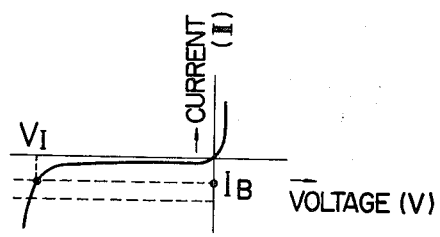
FIG. 4 is a graphical representation for explaining the bias application according to the manner of FIG. 1.

In the case of testing a semiconductor integrated circuit, application of the bias voltage and an input voltage is ordinarily necessary. These voltages can be effectively and easily generated according to the method of the present invention. An embodiment of this case will be described in connection with FIG. 3, in which an electron beam 12 is projected onto a metallic electrode 11 made of, for example, an aluminum layer, said electrode being connected to a p type region 10. In this case, if let it be assumed that the pn junction has a character such as that shown in FIG. 4, then an electric current identical to the input beam current $I_B$ corresponding to the difference obtained by subtracting the reflection electron current and the secondary electron current from the beam current flows to the junction in the reverse bias condition. For instance, in the case of an input beam current of about $10^{-6}$–$10^{-12}$ A, the junction is maintained at the condition just prior to reverse-break down, whereby break down voltage ($V_B$) of about several volts to several tens of volts is generated at said junction.

Furthermore, for the purpose of applying an input power, it is possible to adopt a method of emitting an electron beam capable of generating an electron hole pair on the portion near the input transistor or diode, thus causing forward bias on the junction. Generation of this forward bias becomes equivalent to the application of an input voltage. In this case, if the elctron beam is modulated in accordance with a signal, any kind of input signal can be applied to said electronic circuit.

Figure 5:
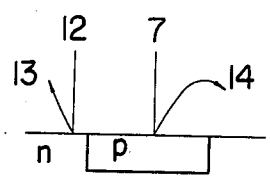
FIG. 5 is a schematic side view indicating a method adapted to potential detection according to the present invention.

In embodying the method of the present invention, various system can be considered for leading out an output signal. For example, an output signal can be obtained by detection of secondary electrons in accordance with the manner as described in connection with FIG. 2. Such detection of secondary electrons is indicated in FIG. 5 also, in which the numerals 7 and 14 correspond respectively to those in FIG. 2. Furthermore, an output signal can be obtained by detecting reflection electrons 13 generated by application of an electron beam 12 as indicated in FIG. 5, by means of a suitable detector according to a principle similar to that of a scanning type electromicroscope. Particularly, the secondary electrons can effectively produce an output signal corresponding to the potential distribution on the surface of the circuit.

Figure 6A:
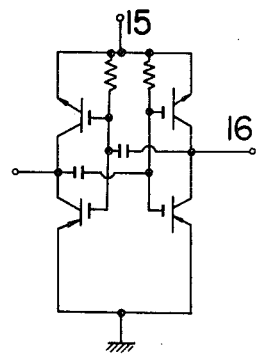
FIG. 6(A) is an example of connection diagram to which the method of the present invention is applied.
Figure 6B:
FIG. 6(B) shows an output wave of the circuit of FIG. 6(A).

An example of actual application of the method of the present invention is illustrated in FIG. 6(A). This example corresponds to a free-running flip-flop circuit, in which an electron beam for biasing is applied to the portion near the supply terminal 15. According to this circuit, when the potential distribution at the portion near the output terminal 16 is measured, an output signal as indicated by the wave 17 in FIG. 6(B) can be observed.

In embodying the method of the invention, two kinds of electron beams adapted respectively to biasing and detecting are required. For this purpose, there are various systems for adopting combinations of said electron beams, examples thereof being as follows.

(1) Device provided with two or more electron guns and control means capable of controlling independently said electron guns can be used.

(2) In the case where a very weak electron beam is to be emitted for the biasing, provision of a very simple electron generator with which a broad electron beam is applied over the whole surface of the device under test may be necessary.

(3) In the case of a circuit including a capacitance therein, only one kind of electron beam can be used as an input beam or a detecting beam by switching thereof. That is, measuring of the circuit can be accomplished during discharge of the capacitance after switching of the beam from input operation to detecting operation. In this case, if a high speed switching pulse is used, it is possible to carry out measurement by use of the mere capacitance between the wiring conductors. As an actual example of this case, only a single electron gun provided for biasing can be arranged so as to be switched from biasing to detecting. In this case, this switching should be carried out prior to the instant when the charge in the capacitors is not completely discharged. Therefore, this system can be utilized for any particular case.

According to the method of this invention, when an electron beam having a suitable accelerating voltage is used, it is possible to impart an electric potential to the conductor beneath an insulating material. Since the penetrating depth of an electron beam into a material is ordinarily in proportion to 1.5-2 square of the accelerated voltage, an electron beam having an accelerated voltage above 10 kv. can easily pass through an insulating material of a thickness of from 1 micron to 3 microns. This case can be treated in the same manner as the case in which the electroconductor to be tested is exposed on the surface of the substrate.

Furthermore, in embodying the method of this invention, it is possible to measure, from outside, an electron beam projected on a desired portion by using a suitable electronic computer. Accordingly, measurement speed becomes higher by several to several tens of times than those of the conventional methods because said measurement is based on an electronic system. Moreover, according to the practice of the present invention, the resulting data may be easily recorded or memorized, whereby any succeeding processing, for example, succeeding wiring can be carried out by the use of the same electron beams as that used for measuring.

By the practice of the method of the present invention, no mechanical contact is required, and, accordingly, an electrode surface adapted to probe contact becomes unnecessary. Furthermore, with respect to the electrode area for bonding, a relatively large circuit is required conventionally. However, when an electron beam is used as in the case of the present invention, since wiring between chips is achieved by the use of an electron beam, bonding on the unit chip becomes unnecessary, and at most only the outermost part of the wafer or large chip may be provided with a bonding electrode, whereby the necessary area of the wafer is greatly reduced, and economical voluation of any integrated circuit can be effectively improved.

As a yhole, the method of this invention is advantageous in that it is possible to test, at high speed, any connection state and character of an extremely delicate and complex wiring network such as, for example, an integrated circuit, multilayer wiring ptate, semiconductor circuit and the like by the use of only an electron beam or beams without any mechanical contact or electrode, whereby the time required for the testing is remarkably shortened. Furthermore, a high-speed processing of the output information by an electronic computer is made possible, whereby a remarkable advantage is obtained in the testing and fabrication of any electronic device as described above.

We claim:

1. A method of testing connection or character of an eletcronic device, which comprises projecting an electron beam onto a portion of said device to supply an electric energy to said portion thereby to produce an electric potential at another portion of said device, said another portion being electrically connected with said former portion through a circuit element or elements; and projecting another electron beam onto said another portion and measuring secondary electrons, reflected electrons or absorbed current from said another portion and caused by said another electron beam, thereby to detect potential change of said another portion.

2. A method of testing a circuit connection or character of an electronic device, which comprises:
   (a) projecting an electron beam through a deflection system onto a portion of said device to generate an electric potential at said portion;
   (b) projecting another electron beam onto another portion of said device by using another deflection system, current value of said beam being made to be smaller than that of said beam in (a), and said another portion being electrically connected with said former portion in (a) through a circuit element or elements; and
   (c) measuring secondary electrons, reflected electrons or absorbed current from said another portion and caused by said another electron beam, thereby to detect electric potential at said another portion, said electric potential being caused by said electron beams and state of said electrically connected portion between said portion in (a) and said another portion in (b).

3. A method of testing operation of an electric device, which comprises:
   (a) projecting an electron beam onto a portion of said device by means of a deflection system thereby to supply an electric energy onto at least one portion of said device and to bring said portion into operation;

(b) projecting another electron beam onto another portion of said device by using another deflection system, current value of said beam being made to be smaller than that of said beam in (a); and (c) measuring secondary electrons, reflected electrons or absorbed current from said another portion and caused by said projected another electron beam, thereby to detect electric potential or output waveform at said another portion, said electric potential being caused by said operation of said former portion in (a).

References Cited

UNITED STATES PATENTS 2,860,251  11/1958  Pakswer et al.
3,373,353  3/1968  Harris _____ 324—54
3,436,651  4/1969  Helms et al. _____ 324—51

GERARD R. STRECKER, Primary Examiner

U.S. Cl. X.R.

324—158